(12) United States Patent
Ehlen

(10) Patent No.: US 10,324,884 B2
(45) Date of Patent: Jun. 18, 2019

(54) MEMORY DRIVE ADAPTERS AND MEMORY DRIVE UNITS INCORPORATING THE SAME

(71) Applicant: Facebook, Inc., Menlo Park, CA (US)

(72) Inventor: Jon Brian Ehlen, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 35 days.

(21) Appl. No.: 15/394,709

(22) Filed: Dec. 29, 2016

(65) Prior Publication Data
US 2018/0189218 A1    Jul. 5, 2018

(51) Int. Cl.
*G06F 13/20* (2006.01)
*G06F 13/40* (2006.01)
*G06F 13/42* (2006.01)

(52) U.S. Cl.
CPC ........ *G06F 13/4068* (2013.01); *G06F 13/409* (2013.01); *G06F 13/4282* (2013.01); *G06F 2213/0026* (2013.01)

(58) Field of Classification Search
CPC ............. G06F 13/4068; G06F 13/4282; G06F 2013/0026
See application file for complete search history.

(56) References Cited

U.S. PATENT DOCUMENTS

| | | | |
|---|---|---|---|
| 6,850,410 B2* | 2/2005 | Peeke | G11B 33/125 248/562 |
| 7,088,579 B1* | 8/2006 | Konshak | G06F 1/184 361/679.32 |
| 8,094,446 B2* | 1/2012 | Liu | G11B 33/124 361/679.33 |
| 8,432,684 B2* | 4/2013 | Wu | G06F 1/185 361/679.41 |
| 8,725,946 B2* | 5/2014 | Petersen | G06F 3/0611 361/760 |

OTHER PUBLICATIONS

LOSKTOR M23 PCI slot mobile rack for 2.5" HDD/SSD; 2013; akasa; Version 1; p. 1 (Year: 2013).*
Apricorn Velocity Duo SSD Upgrade Kit and Disc Array for PC and Mac (VEL-DUO); Sep. 18, 2014; Amazon.com; pp. 1-8 (Year: 2014).*

* cited by examiner

*Primary Examiner* — Idriss N Alrobaye
*Assistant Examiner* — Richard B Franklin
(74) *Attorney, Agent, or Firm* — FisherBroyles, LLP

(57) ABSTRACT

Technology is provided for a memory drive adapter. The memory drive adapter is used for combining memory drives within an alternative form factor. For example the memory drive adapter can include an adapter frame configured for compatibility with a peripheral component interface. The adapter frame can include first and second spaced apart cover panels. A mounting panel extends between the first and second cover panels. An end panel is positioned opposite the mounting panel and extends between the first and second cover panels. One or more divider tabs extend between the first and second cover panels substantially midway between the mounting panel and the end panel to define a pair of drive bays, each configured to receive a 2.5-inch solid state drive.

13 Claims, 5 Drawing Sheets

MEMORY DRIVE ADAPTERS AND MEMORY DRIVE UNITS INCORPORATING THE SAME

TECHNICAL FIELD

This patent application is directed to data storage server configurations and, more specifically, to memory drive adapters and memory drive units.

BACKGROUND

Traditionally, server configurations are usually configured to accept one type and size of memory drive, such as a 3.5-inch hard disc drive (HDD) or a peripheral component interface (PCI) card. However, in the course of maintaining and upgrading data storage servers, it may be desirable to change the memory drive type and/or size within the existing memory drive form factor. For example, in some cases, it may be desirable to replace a PCI card with one or more 2.5-inch solid state drives (SSD).

BRIEF DESCRIPTION OF THE DRAWINGS

Embodiments of the memory drive adapters and the memory drive units described herein may be better understood by referring to the following Detailed Description in conjunction with the accompanying drawings, in which like reference numerals indicate identical or functionally similar elements.

Figure 1:
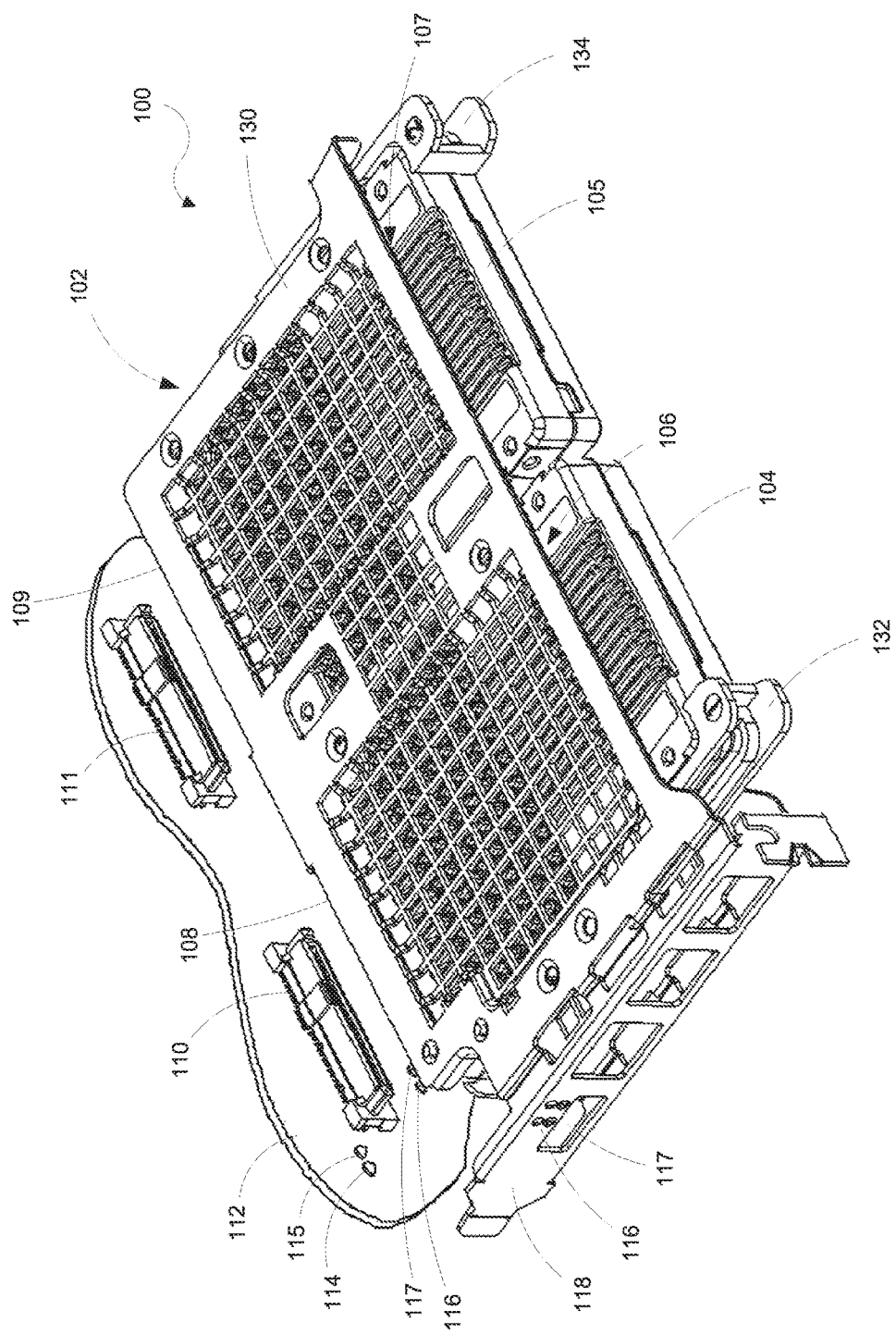
FIG. 1 is an isometric view of a memory drive unit according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, equivalents, and alternatives falling within the scope of the embodiments as defined by the appended claims.

DETAILED DESCRIPTION

Overview

Technology is provided for a memory drive adapter. The memory drive adapter is used for combining one or more memory drives within an alternative form factor. For example, in at least one embodiment, the disclosed memory drive adapters combine two 2.5-inch SSDs into a PCI form factor. In a representative embodiment, a memory drive adapter can include an adapter frame configured for compatibility with a PCI. The adapter frame can include first and second spaced apart cover panels. In some embodiments, the first and second cover panels are both at least partially perforated to facilitate cooling memory devices housed in the adapter frame. A mounting panel extends between the first and second cover panels. The mounting panel can facilitate mounting the memory drive adapter to an associated server chassis. An end panel is positioned opposite the mounting panel and also extends between the first and second cover panels. One or more divider tabs extend between the first and second cover panels substantially midway between the mounting panel and the end panel to define a pair of drive bays, each configured to receive a memory device, such as a 2.5-inch SSD, for example. A first retainer is coupled to the mounting panel and a second retainer is coupled to the end panel, each configured to retain a corresponding memory device in one of the respective drive bays.

Also disclosed herein are memory drive units including a memory drive adapter and one or more memory drives positioned in the adapter. The memory drive units are configured to interface with a PCI connection of a server, for example. In a representative embodiment, the memory drive unit can include a memory drive adapter and a pair of memory devices each positioned in a corresponding drive bay of the adapter. Each memory device can include a drive connector configured to couple to a corresponding chassis connector on a PCB. In some embodiments, one or more light pipes extend between one of the pair of drive bays and the mounting panel, wherein when the memory drive unit is connected to the PCB, the pair of light pipes is positioned relative to a pair of indicator LEDs positioned on the PCB for transmitting light from the LEDs to the mounting panel. The LEDs can provide a status indication corresponding to each memory drive, for example.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a memory drive unit 100 according to a representative embodiment. The memory drive unit 100 includes a memory drive adapter 102 and a pair of memory devices 104/105, each positioned in a corresponding drive bay 106/107 of the memory drive adapter 102. Each memory device 104/105 includes a drive connector 108/109 configured to mate with a corresponding connector 110/111 mounted on a PCB 112. In some embodiments, the memory devices 104/105 are 2.5-inch SSDs. In some embodiments, the memory drive adapter 102 is configured for compatibility with a PCI. The connectors on the SSDs can be accessible for use with mating SSD connectors, such as connectors 110/111 on the PCB 112 or with adapters configured to convert from an SSD connector to a PCI connector.

The memory drive adapter 102 can include an adapter frame 130 and a pair of retainers 132 and 134, each corresponding to an associated one of the pair of drive bays 106 and 107, respectively. In some embodiments, the memory drive adapter 102 includes a pair of light pipes 116 and 117 corresponding to the drive bays 106 and 107, respectively. The light pipes 116/117 extend between a position adjacent one of the drive connectors (e.g., connector 108) and a mounting panel 118, such that when the memory drive unit 100 is connected to the PCB 112, the light pipes 116/117 are positioned relative to a pair of indicator LEDs 114/115 positioned on the PCB 112. In some embodiments, the indicator LEDs 114 and 115 can indicate a status of the memory devices 104 and 105, respectively. The light pipes 116/117 transmit light from the LEDs 114/115 to the mounting panel 118 so that the status of the memory devices 104/105 can be more easily viewed by a technician.

Figure 2:
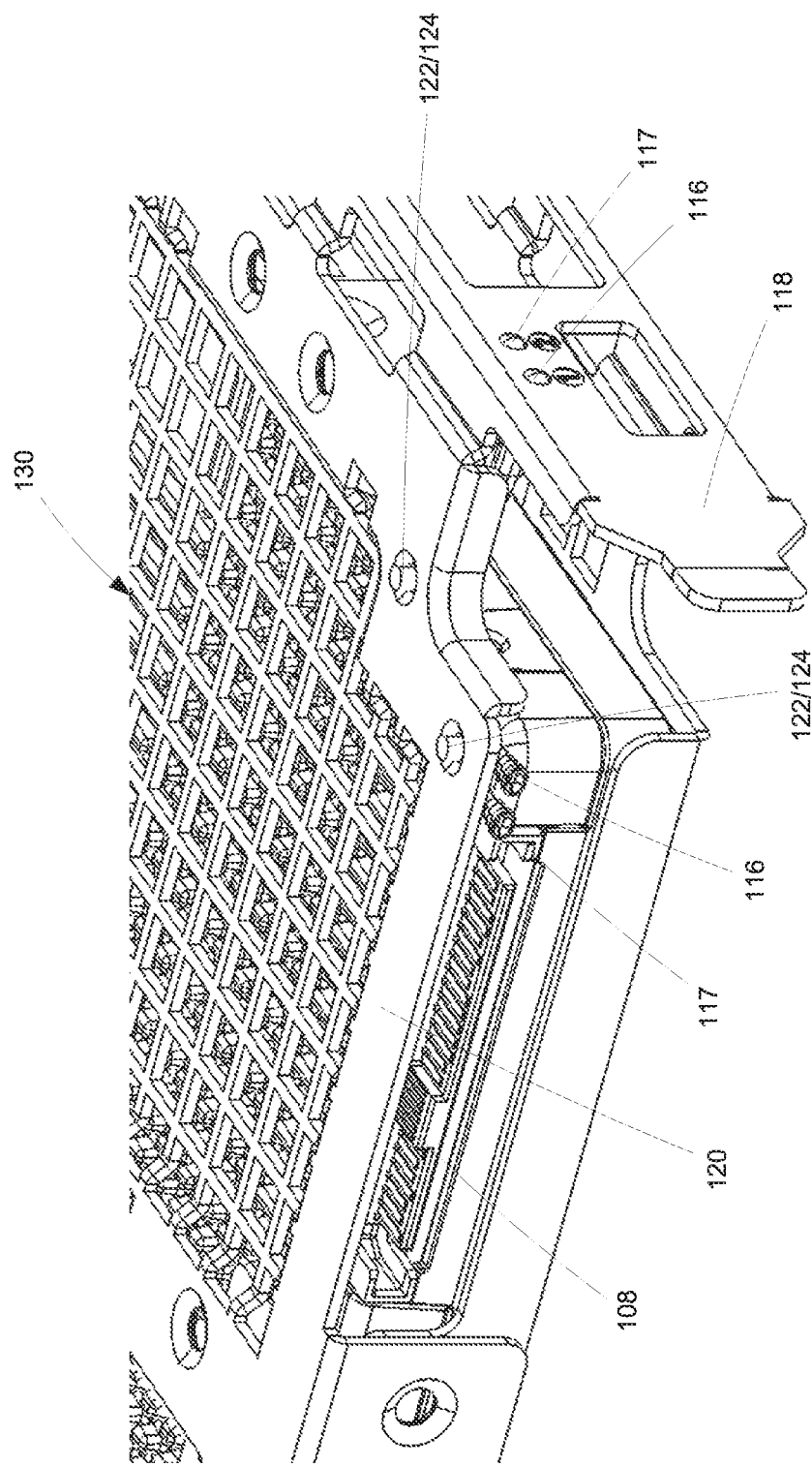
FIG. 2 is an enlarged partial isometric view of the memory drive unit introduced in FIG. 1 as viewed from the back.
Figure 3:
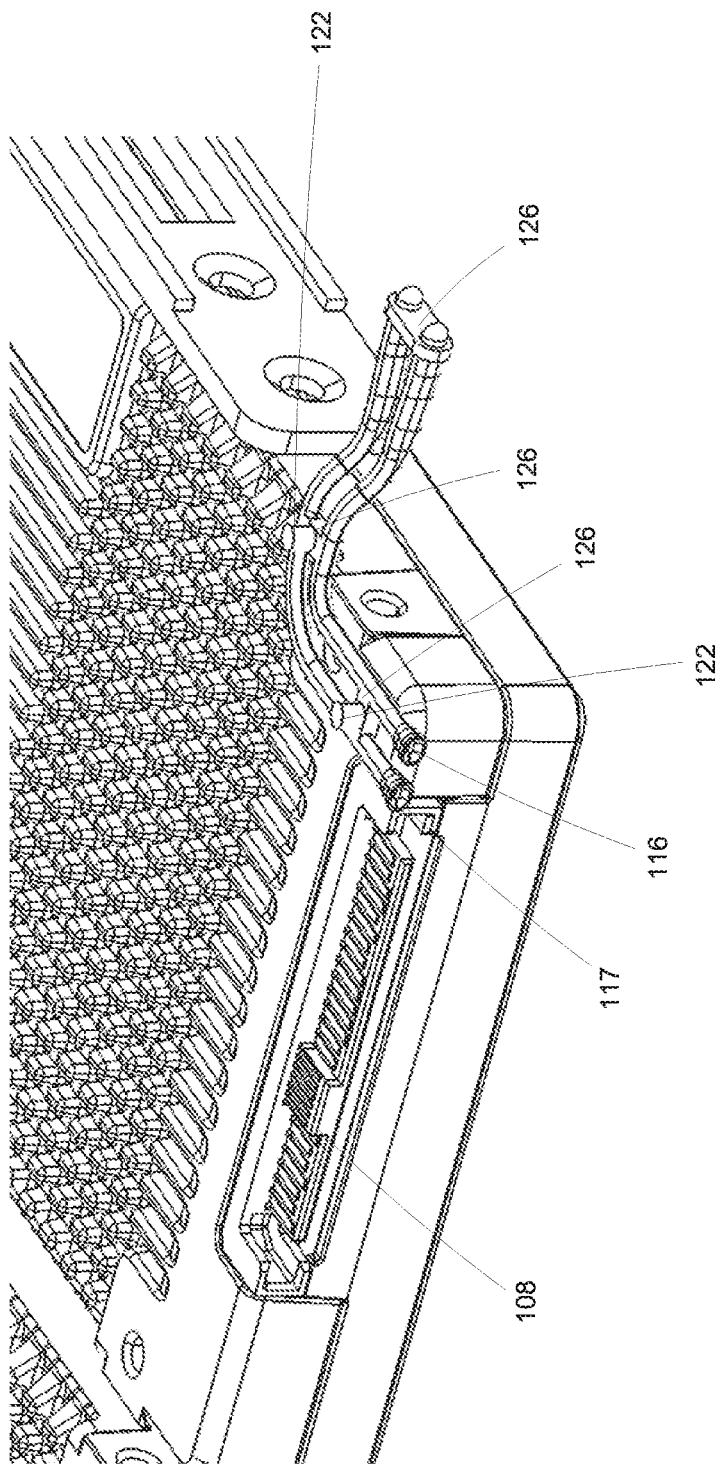
FIG. 3 is a partial isometric view of the memory drive unit with the adapter frame removed to illustrate various components.

With further reference to FIGS. 2 and 3, the light pipes 116/117 can be attached to a cover panel 120 of the adapter frame 130 with a pair of deformable mounting pins 122 that extend through corresponding apertures 124 formed through the cover panel 120. In some embodiments, the mounting pins 122 are deformed by melting the pins (e.g., heat staking). With specific reference to FIG. 3, the light pipes 116/117 can be joined together by several cross braces 126 to form a unitary body. For example, the light pipes 116/117 can be molded from a transparent or translucent plastic material suitable to provide a light guide between the LEDs 114/115 (FIG. 1) and the mounting panel 118.

Figure 4:
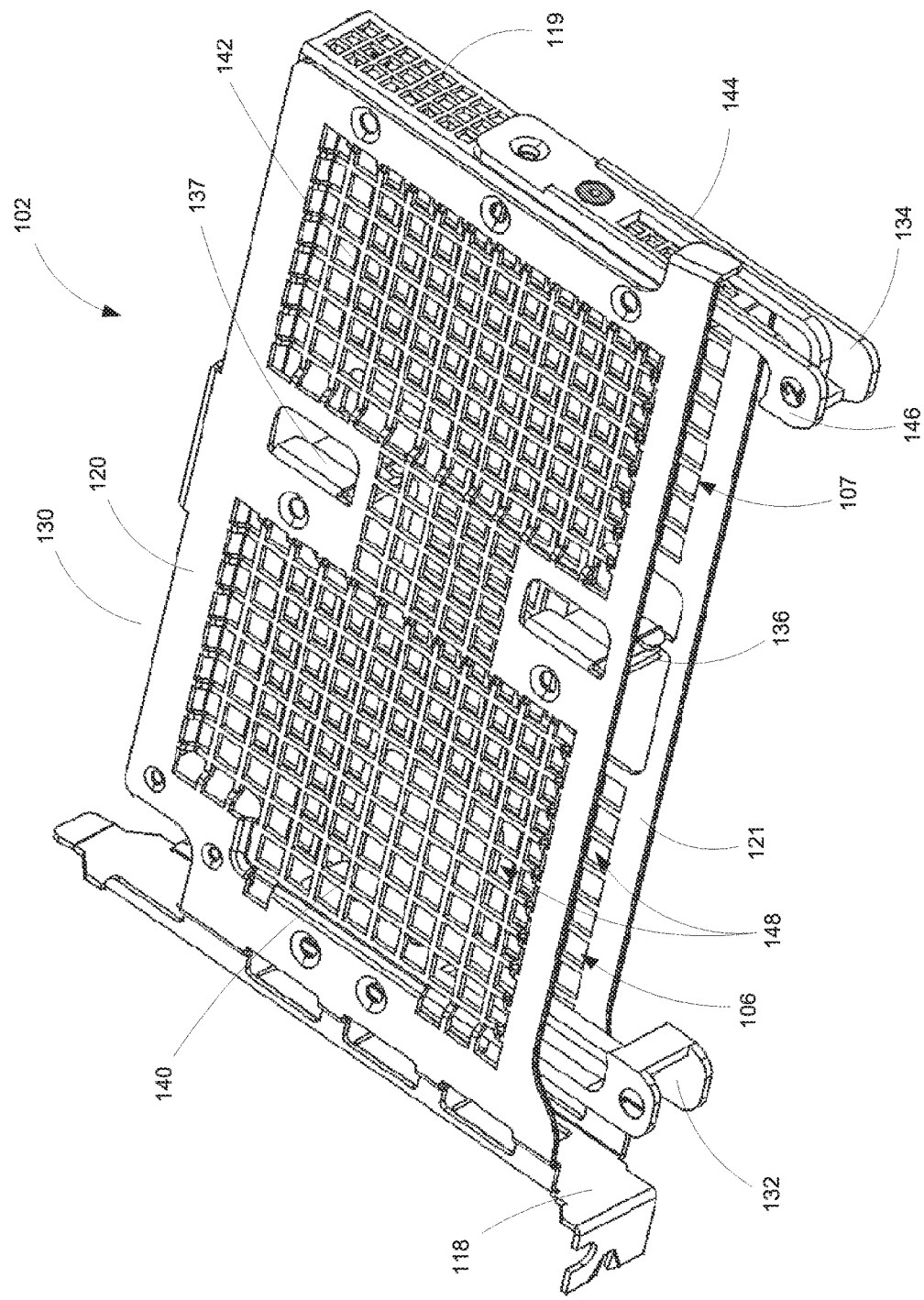
FIG. 4 is an isometric view of a memory drive adapter according to a representative embodiment.

As shown in FIG. 4, the adapter frame 130 includes first and second spaced apart cover panels 120 and 121, respectively. The mounting panel 118 extends orthogonally between the first and second cover panels 120/121. In some embodiments, the mounting panel 118 conforms to a standard PCI bracket configuration. An end panel 119 located opposite the mounting panel 118 also extends between the first and second cover panels 120/121. A pair of dividers 136/137 extend between the first and second cover panels 120/121 approximately midway between the mounting panel 118 and the end panel 119 to define the drive bays 106/107. In some embodiments, the first and/or second cover panel 120/121 includes regions 140 and 142 recessed toward the other cover panel 121/120. The recessed regions 140/142 reduce the height of the drive bays 106/107 from the PCI height to a height approximately corresponding to the thickness of the SSDs, such that each SSD is securely restrained from excess movement between the cover panels 120/121. In other embodiments, the cover panels 120/121 can be contoured to receive and accommodate memory devices with other shapes or sizes between the cover panels 120/121 while resisting or restricting excess movement in directions normal to the cover panels. This restraint of the memory devices help avoid excess torque or other twisting loads at the interface between the drive connectors 108/109 and the corresponding connectors 110/111 (FIG. 1). In some embodiments, the first and second cover panels 120/121 are perforated to facilitate cooling the memory devices 104/105. In the embodiment depicted in the figures, the perforations comprise an array of square shaped apertures 148. However, in other embodiments the perforations can comprise different patterns and/or shapes of apertures.

The retainers 132 and 134 each include an arm 144 and a hook portion 146 disposed on an end of the arm 144. The arm 144 is attached to the adapter frame 130 with suitable fasteners (not shown) and is configured to deflect when the hook portion 146 is moved either by pushing a memory device into the drive bay, or when moved manually by a technician. In some embodiments, the retainers 132/134 can comprise a resilient material, such as plastic.

Figure 5:
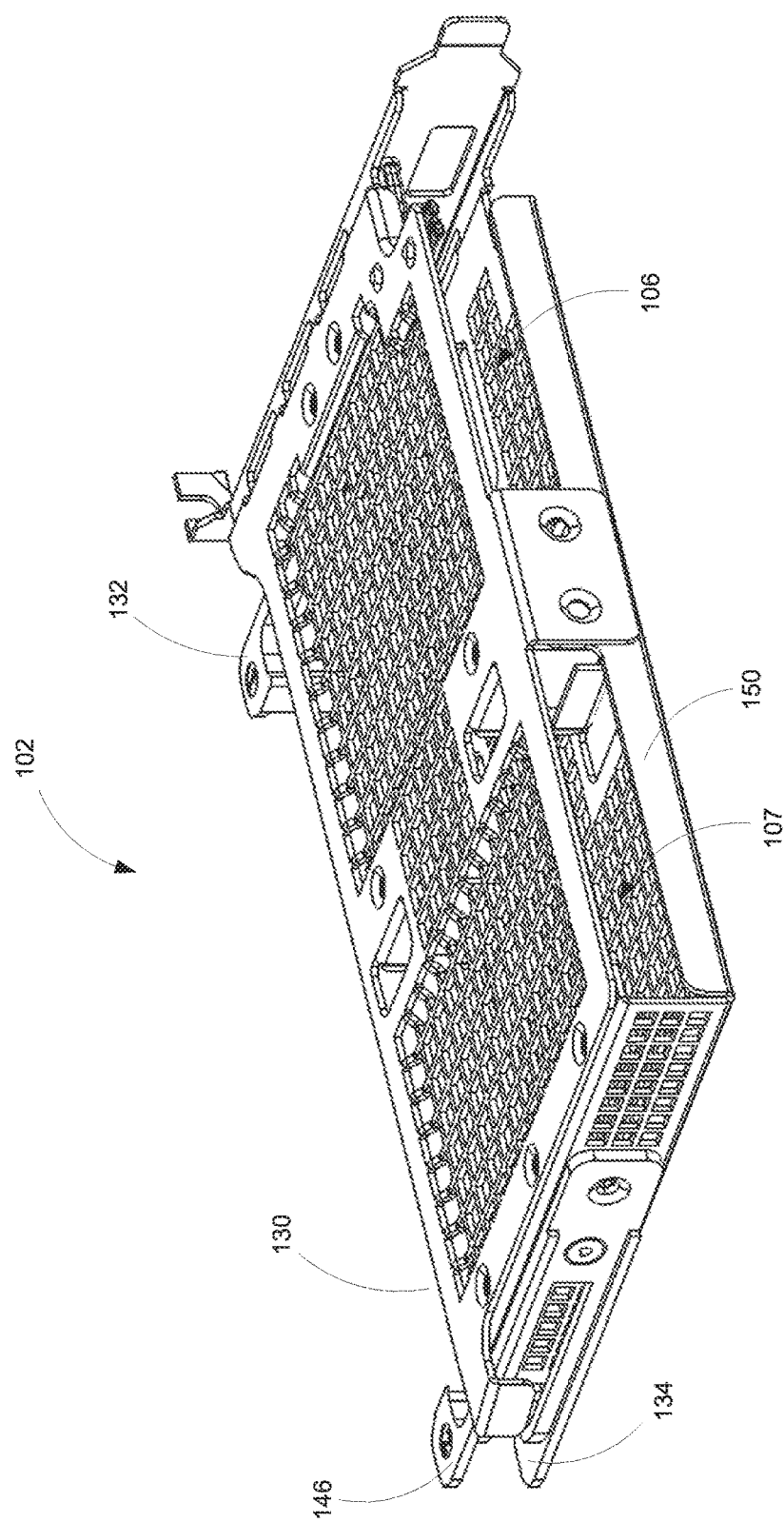
FIG. 5 is an isometric view of the memory drive adapter shown in FIG. 4 as viewed from the back.

As shown in FIG. 5, the adapter frame 130 includes a back panel 150 positioned opposite the drive bay openings. When the memory devices 104/105 (FIG. 1) are installed in the drive bays 106/107, they abut the back panel 150 and are held in position by the hook portions 146 of the retainers 132/134. As can be appreciated in the figures, the first and second cover panels 120/121, the end panel 119, the mounting panel 118, the back panel 150, and the one or more dividers 136/137 can be constructed of sturdy sheet metal, bent, or otherwise formed into the proper shape. In other embodiments, the adapter frame 130 can be made of other sturdy material, such as formed or molded plastic, composite materials, or the like. In at least one embodiment, a single piece of continuous sheet metal can be used to form the above features of the adapter frame 130. In other embodiments, the adapter frame 130 can comprise multiple components joined together with fasteners, adhesive, or suitable joining processes such as welding, for example.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A memory drive adapter positioned within a data storage server, comprising:
   an adapter frame configured for compatibility with a peripheral component interface (PCI) connection of a server, including:
      first and second spaced apart cover panels, at least one of which is at least partially perforated with a plurality of square shaped apertures;
      a mounting panel extending orthogonally between the first and second cover panels that facilitates mounting the memory drive adapter to an associated server chassis;
      an end panel opposite the mounting panel extending between the first and second cover panels; and
      one or more dividers extending between the first and second cover panels approximately midway between the mounting panel and the end panel to define a pair of drive bays each configured to receive a memory drive, wherein the first cover panel includes one or more recessed regions, recessed toward the second cover panel, that reduce the height of the drive bays from a standard PCI height to a height approximately corresponding to the thickness of a 2.5-inch solid state drive (SSD); and
   a pair of retainers coupled to the adapter frame, each corresponding to an associated one of the pair of drive bays.

2. The memory drive adapter of claim 1, wherein the pair of drive bays are each configured to receive a 2.5-inch solid state drive (SSD).

3. The memory drive adapter of claim 1, further comprising one or more light pipes extending between one of the pair of drive bays and the mounting panel, wherein each light pipe is positioned relative to a pair of indicator LEDs configured to transmit light from the pair of indicator LEDs to the mounting panel to provide a status indication corresponding to each memory drive.

4. The memory drive adapter of claim 3, wherein the light pipes are joined together by a plurality of cross braces to form a unitary body.

5. The memory drive adapter of claim 1, wherein the first and second cover panels, the end panel, the mounting panel, and the one or more dividers comprise a continuous piece of sheet metal.

6. The memory drive adapter of claim 1, wherein the pair of retainers each include an arm that flexes to releaseably retain a memory drive in the associated one of the pair of drive bays.

7. A memory drive adapter positioned within a data storage server, comprising:
   an adapter frame configured for compatibility with a peripheral component interface (PCI) of a server, including:
      first and second spaced apart cover panels, wherein the first and second cover panels are both at least partially perforated with a plurality of square shaped apertures;
      a mounting panel extending orthogonally between the first and second cover panels that facilitates mounting the memory drive adapter to an associated server chassis;
      an end panel opposite the mounting panel extending between the first and second cover panels; and
      one or more divider tabs extending between the first and second cover panels substantially midway between the mounting panel and the end panel to define a pair of drive bays, each configured to receive a 2.5-inch SSD, wherein:
         the first cover panel includes one or more recessed regions, recessed toward the second cover panel, that reduce the height of the drive bays from a standard PCI height to a height approximately corresponding to the thickness of a 2.5 inch Solid State Drive (SSD); and
         the first and second cover panels, the end panel, the mounting panel, and the one or more divider tabs comprise a continuous piece of sheet metal;
   a first retainer coupled to the mounting panel and a second retainer coupled to the end panel wherein the first and second retainers each include an arm that flexes to releaseably retain an SSD in an associated one of the pair of drive bays; and
   one or more light pipes extending between one of the pair of drive bays and the mounting panel, wherein each light pipe is positioned relative to a pair of indicator LEDs configured to transmit light from the pair of indicator LEDs to the mounting panel to provide a status indication corresponding to each SSD.

8. A memory drive unit for connection to a printed circuit board (PCB), comprising:
   a memory drive adapter, including:
      an adapter frame, including:
         first and second opposed cover panels, at least one of which is at least partially perforated with a plurality of square shaped apertures;
         a mounting panel extending orthogonally between the first and second cover panels that facilitates mounting the memory drive adapter to an associated server chassis;
         an end panel opposite the mounting panel extending between the first and second cover panels; and
         one or more dividers extending between the first and second cover panels approximately midway between the mounting panel and the end panel to define a pair of drive bays each configured to receive a memory drive, wherein the first cover panel includes one or more recessed regions, recessed toward the second cover panel, that reduce the height of the drive bays from a standard PCI height to a height approximately corresponding to the thickness of a 2.5 inch solid state drive (SSD);
      a pair of retainers each corresponding to an associated one of the pair of drive bays; and
      a pair of light pipes extending between one of the pair of drive bays and the mounting panel; and
   a pair of memory devices each positioned in a corresponding one of the pair of drive bays, each memory device including a connector to connect to a corresponding connector on the PCB;
   wherein when the memory drive unit is connected to the PCB, the pair of light pipes is positioned relative to a pair of indicator LEDs positioned on the PCB for transmitting light from the pair of indicator LEDs to the mounting panel.

9. The memory drive unit of claim 8, wherein the adapter frame is configured for compatibility with a peripheral component interface (PCI) and the pair of drive bays are each configured to receive a 2.5-inch solid state drive (SSD).

10. The memory drive unit of claim 8, wherein each light pipe is positioned relative to a pair of indicator LEDs configured to transmit light from the pair of indicator LEDs to the mounting panel.

11. The memory drive unit of claim 10, wherein the pair of indicator LEDs provide a status indication corresponding to each memory drive.

12. The memory drive unit of claim 8, wherein the first and second cover panels, the end panel, the mounting panel, and the one or more dividers comprise a continuous piece of sheet metal.

13. The memory drive unit of claim 8, wherein the pair of retainers each includes an arm that flexes to releaseably retain a memory drive in the associated one of the pair of drive bays.

* * * * *